United States Patent [19]

Yamaguchi

[11] Patent Number: 4,514,908
[45] Date of Patent: May 7, 1985

[54] LEVEL WITH TWO GUIDE FRAMES AND BALL IN EACH

[75] Inventor: Izumi Yamaguchi, Ohmiya, Japan

[73] Assignee: Kabushiki Kaisha Nagaoka, Tokyo, Japan

[21] Appl. No.: 637,865

[22] Filed: Aug. 6, 1984

[30] Foreign Application Priority Data

Apr. 13, 1984 [JP] Japan ............... 59-54519[U]

[51] Int. Cl.³ .................................................. G01C 9/10
[52] U.S. Cl. ............................................ 33/365; 33/1 H; 33/395; 116/215
[58] Field of Search ................ 33/365, 375, 395, 398, 33/1 H; 116/215

[56] References Cited

U.S. PATENT DOCUMENTS

| 2,067,474 | 1/1937 | Carbonara | 33/365 |
| 2,068,017 | 1/1937 | Given | 33/365 |
| 2,411,165 | 11/1946 | McBride | 33/365 |
| 2,859,725 | 11/1958 | Genasci | 116/215 X |
| 3,548,508 | 12/1970 | Jacobsen | 33/1 H X |

Primary Examiner—Robert S. Ward
Attorney, Agent, or Firm—James E. Nilles

[57] ABSTRACT

A level characterized wherein two guide frames are arranged within a base member one above the other so that they cross each other at right angles. The guide frames are provided with internal rolling-contact surfaces each shaped as an upward-curving circular arc, respectively, the lowest parts of the rolling-contact surfaces being positioned at the point at which the guide frames cross, and the interiors thereof being visible through top surfaces thereof. Balls are contained rotatably in the two guide frames, respectively. The ball in the upper guide frame is formed so as to have a diameter slightly smaller than that of the ball in the lower guide frame.

2 Claims, 7 Drawing Figures

LEVEL WITH TWO GUIDE FRAMES AND BALL IN EACH

BACKGROUND OF THE INVENTION

1. Field of the Invention

The present invention relates to a level for measuring the inclination of a surface in all directions.

2. Description of the Prior Art

A variety of levels designed to measure the inclinations of surfaces in all directions have been proposed heretofore, such as a level, for instance, constructed of an indication bubble enclosed in a round, flat case. This kind of level, however, is very expensive and is not suitable for mass-production when it is formed of a large size which is easy to see.

In another level wherein a ball is held in a round, flat case whose inner bottom surface is formed as a concave circular-arc surface, it takes a long time for the ball to come to rest, and the internal concave surface must be formed to a high degree of precision in all directions, which makes this type of level expensive as well.

A third type of level is constructed by arranging two unidirectional levels at right angles in the same plane or a base plate. This level necessitates sequential checking of two measurement points, which makes the operation thereof time-consuming.

SUMMARY OF THE INVENTION

An object of the present invention is to solve these problems and provide a level which is convenient to use and easy to manufacture.

The level of the present invention is characterized by comprising a base member; two guide frames arranged in the base member so that they cross each other but are in different planes and which are provided with internal rolling-contact surfaces shaped as upward-curving circular arcs, the lowest parts of the rolling-contact surfaces being positioned at the point at which the guides cross, and the interiors thereof being visible through the upper surfaces thereof; and a ball contained within each of the two guide frames so that it can roll therein. The degree of horizontality of a surface is measured from the superposition of these two balls.

Other objects and characteristics of the present invention will be described hereunder with reference to the accompanying drawings.

DESCRIPTION OF THE PREFERRED EMBODIMENTS

Figure 1:
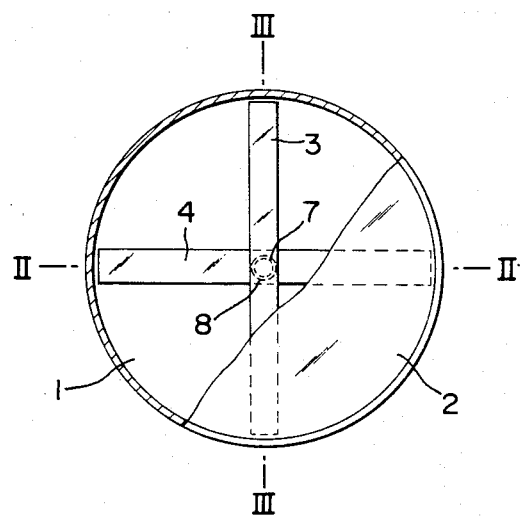
FIG. 1 is a partially-cutaway plan view of one embodiment of the level according to the present invention.

Numeral 1 denotes a round, flat, case-shaped base member provided with a horizontal base surface and an open top surface, and a transparent top plate 2 is fitted over the top surface. Two long, narrow, linear guide frames 3 and 4 provided with support frames 5 and 6, respectively, are positioned one above the other within the base member 1 so as to cross each other. Each of the two guide frames 3 and 4 is formed as an angular tube, and at least the top surface thereof is made transparent so that the interior thereof can be seen therethrough. Inner rolling-contact surfaces 3a and 4a of the tubes are each shaped as an upward-curving circular arc, with the lowest parts of the rolling-contact surfaces 3a and 4a positioned at the point at which the tubes cross each other.

Balls 7 and 8 are contained rotatably in the two guide frames 3 and 4, respectively. The ball 7 in the upper guide frame 3 is of the same diameter at the ball 8 in the lower guide frame 4, or has a diameter slightly smaller than that.

The base member 1 is placed on a surface being measured, and that part of the surface on which the member 1 is placed is determined to be horizontal if the balls 7 and 8 in the upper and lower guide frames 3 and 4 seem to be superposed at the crossing point, when seen through the top surfaces.

This checking of superposition is facilitated by making the diameter of the ball 7 in the upper guide frame 3 smaller than that of the ball 8 in the lower guide frame 4.

This checking is also facilitated by making the two balls 7 and 8 of different colors.

Another embodiment of the present invention will be described hereunder, with reference to FIGS. 4 to 7.

Figure 2:
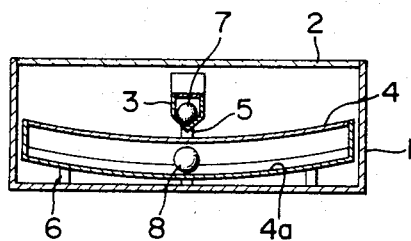
FIG. 2 is a section taken along the line II—II of FIG. 1.
Figure 3:
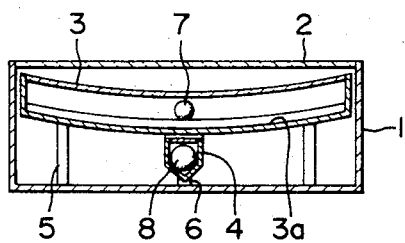
FIG. 3 is a section taken along the line III—III of FIG. 1.
Figure 4:
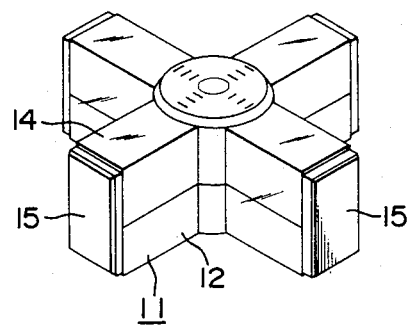
FIG. 4 is a perspective view of another embodiment of the level of the present invention.
Figure 6:
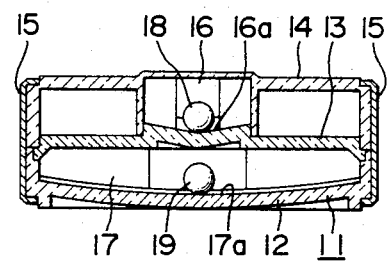
FIG. 6 is a section taken along the line VI—VI of FIG. 5.
Figure 5:
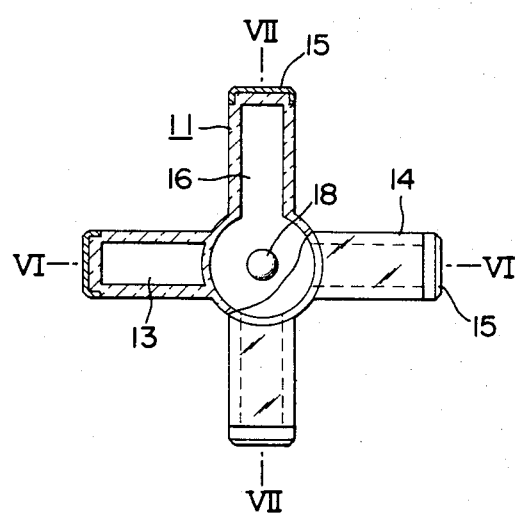
FIG. 5 is a partially-cutaway plan view of the embodiment of FIG. 4.
Figure 7:
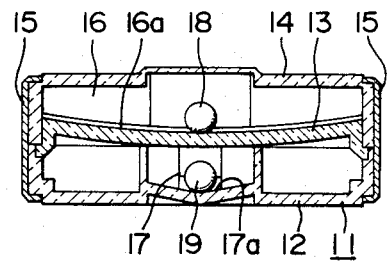
FIG. 7 is a section taken along the line VII—VII of FIG. 5.

The level is shaped overall as a flat cross in this embodiment, while the embodiment of FIGS. 1 to 3 is shaped overall as a flat circle.

Numeral 11 denotes a base member shaped as a cross. Within the base member 11, a cross-shaped intermediate plate 13 is provided above a similar cross-shaped lower frame 12 provided with a horizontal bottom surface and an open top surface, and a similar cross-shaped upper frame 14 with an open lower surface is fitted over the base member 11. The lower and upper frames 12 and 14 are combined integrally by end frames 15 fitted over and bonded to the ends of the crosses thereof.

Two long, narrow, linear guide frames 16 and 17 are provided one above the other within the base member 11, so that they cross each other. In other words, the upper guide frame 16 is formed into a compartment by the upper frame 14 and the intermediate plate 13, and the lower guide frame 17 is similarly formed into a compartment by the lower frame 12 and the intermediate plate 13. Each of the guide frames 16 and 17 is formed in the shape of an angular tube whose interior can be seen through the top surface thereof, since the lower frame 12, the intermediate plate 13, and the upper frame 14 are made of a transparent synthetic resin. Inner rolling-contact surfaces 16a and 17a of the tubular guide frames are shaped as upward-curving circular arcs, with the lowest parts of the rolling-contact surfaces 16a and 17a positioned at the point at which the guide frames cross each other. Balls 18 and 19 are contained rotatably in the two guide frames 16 and 17, respectively.

Although this embodiment is shaped overall as a cross, as described above, measuring therewith is performed in exactly the same way as the previous embodiment.

A square shape or other shapes can be selected if required for the outer body of the level.

Effect of the Invention

According to the present invention, a surface on which the two balls appear to be superposed when viewed from above is determined to be horizontal. This means that the degree of horizontality of a surface is easy to check, and the measurement can be performed easily, since the two balls can be checked simultaneously. The time required for the balls to come to rest is much less than that in a conventional device in which a ball can roll in all directions, because each of two balls rolls in only one direction in the present invention, and thus the measurement can be performed quickly. In addition, the manufacture of the level of the present invention is easier and less expensive than that of a level which has a surface which is concave in all directions.

What is claimed is:

1. A level characterized by comprising:
   a base member;
   two guide frames arranged within said base member one above the other so that they cross each other at right angles, and which are each provided with an internal rolling-contact surface shaped as an upward-curving circular arc, the lowest parts of said rolling-contact surfaces being positioned at the point at which said guide frames cross, and the interiors thereof being visible through top surfaces thereof; and
   a ball contained rotatably in each of said two guide frames.

2. The level according to claim 1, characterized in that said ball in the upper of said guide frames is formed so as to have a diameter slightly smaller than that of said ball in the lower of said guide frames.

* * * * *